(12) United States Patent
Hsu

(10) Patent No.: US 10,372,167 B1
(45) Date of Patent: Aug. 6, 2019

(54) TRANSMISSION BASE AND ELECTRONIC APPARATUS

(71) Applicant: Getac Technology Corporation, Hsinchu County (TW)

(72) Inventor: Wan-Lin Hsu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/039,459

(22) Filed: Jul. 19, 2018

(51) Int. Cl.
*G06F 1/16* (2006.01)
*H05K 5/00* (2006.01)
*H05K 7/00* (2006.01)

(52) U.S. Cl.
CPC .......... *G06F 1/1656* (2013.01); *G06F 1/1635* (2013.01); *G06F 1/1654* (2013.01); *G06F 1/1616* (2013.01)

(58) Field of Classification Search
CPC .... G06F 1/1656; G06F 1/1635; G06F 1/1667; G06F 1/1669; G06F 1/1671
USPC ........................... 361/679.17, 679.41–679.44
See application file for complete search history.

(56) References Cited

U.S. PATENT DOCUMENTS

| | | | | |
|---|---|---|---|---|
| 1,022,836 | A * | 4/1912 | Ferenczy | A01B 49/022 172/120 |
| 6,385,041 | B1 * | 5/2002 | Choi | G06F 1/1616 16/221 |
| 6,937,468 | B2 * | 8/2005 | Lin | G06F 1/1632 361/679.41 |
| 8,910,863 | B2 * | 12/2014 | Wojcik | G06K 7/082 235/383 |
| 9,600,034 | B2 * | 3/2017 | Kiple | |
| 2004/0246666 | A1 * | 12/2004 | Maskatia | G06F 1/1616 361/679.57 |
| 2010/0177476 | A1 * | 7/2010 | Hotelling | G06F 1/1632 361/679.41 |
| 2013/0107136 | A1 * | 5/2013 | Tamura | H04N 5/64 348/836 |
| 2013/0170126 | A1 * | 7/2013 | Lee | G06F 1/1654 361/679.17 |
| 2013/0279100 | A1 * | 10/2013 | Fontana | G06F 1/1632 361/679.2 |
| 2014/0355192 | A1 * | 12/2014 | Lin | G06F 1/1669 361/679.17 |
| 2014/0362510 | A1 * | 12/2014 | Hirano | G06F 1/1626 361/679.17 |

(Continued)

*Primary Examiner* — Anthony M Haughton
(74) *Attorney, Agent, or Firm* — Locke Lord LLP; Tim Tingkang Xia, Esq.

(57) ABSTRACT

The present invention provides a transmission base and an electronic apparatus. The transmission base is for receiving a side portion of a first unit of the electronic apparatus. The first unit includes a first battery. The transmission base includes a first wall portion and a second wall portion. The first wall portion and the second wall portion support the side portion. The first wall portion includes a matching structure, which is matched and assembled with a fitting structure of the first battery. When the matching structure of the first wall portion is matched and assembled with the fitting structure, the first unit is electrically connected to the transmission base; when the second wall portion is in contact with the fitting structure, the first unit is non-electrically connected to the transmission base.

10 Claims, 5 Drawing Sheets

(56) References Cited

U.S. PATENT DOCUMENTS

2015/0098182 A1\* 4/2015 Liu ................... G06F 1/1681
361/679.55

\* cited by examiner

TRANSMISSION BASE AND ELECTRONIC APPARATUS

BACKGROUND OF THE INVENTION

Field of the Invention

The invention relates a transmission base and an electronic apparatus having the transmission base.

Description of the Prior Art

When a tablet computer apparatus is purchased in the current days, the apparatus usually includes a display unit and a keyboard support unit, wherein the display unit and the keyboard support unit are assembled in a matching manner. Further, when the display unit has a front side facing the keyboard support unit, a user can control an image on the display unit by operating a keyboard portion of the keyboard support unit. When the display unit has a back side facing the keyboard portion, the keyboard support unit exercises only a support effect and erects the display unit on a desk. Accordingly, a consumer can directly touch control the display unit and view the image displayed thereon.

Further, a consumer may choose to use large-capacity battery or a small-capacity battery for the above apparatus. A slot of the display unit is able to accommodate a large-capacity battery or a small-capacity battery chosen. One difference in the above application is that, a large-capacity battery has a greater volume and a larger thickness, and is more likely to protrude out of the back side of the display unit. As a result, when the keyboard support unit is used for solely supporting the display unit, because the battery and the keyboard portion are located on the same side, the possibility of having the large-capacity battery come into contact with and hence damage the keyboard portion is significantly increased if the user again adjusts an inclined angle of the display unit relative to the keyboard support unit.

SUMMARY OF THE INVENTION

To achieve the above object, the present invention provides a transmission base and an electronic apparatus having the transmission base. Through a fool-proofing mechanism of the transmission base, a user is allowed to only match and assemble a large-capacity battery in a front-facing manner with a display unit if a large-capacity battery is chosen to be used, so as to prevent the user from an erroneous operation that causes crushing and damage of a keyboard by the large-capacity battery.

A transmission base disclosed by the present invention is operable to bi-directionally receive a side portion of a first unit, wherein the first unit is detachably configured with a first battery. The transmission base includes a first wall portion and a second wall portion. The first wall portion includes a matching structure, which can be matched and assembled with a fitting structure of the first battery. The second wall portion is opposite the first wall portion. The first wall portion and the second wall portion bi-directionally support the side portion. When the matching structure of the first wall portion is matched and assembled with the fitting structure, the first unit is electrically connected to the transmission base. When the second wall portion is in contact with the fitting structure, the first unit is non-electrically connected to the transmission base. In one embodiment, the matching structure is formed on an edge of the first wall portion.

In one embodiment of the present invention, an electronic apparatus includes a first unit, a second unit and a transmission base. The first unit is configured with a display portion, and is detachably configured with a first battery. The second unit is configured with an input portion. The transmission base is pivotally provided at the second unit, and bi-directionally receives a side portion of the first unit. The transmission base includes a first wall portion and a second wall portion that bi-directionally support the side portion. The first wall portion is opposite the second wall portion. The first wall portion includes a matching structure, which matches with a fitting structure of the first battery. When the matching structure of the first wall portion is matched and assembled with the fitting structure, the first unit is electrically connected to the transmission base. When the second wall portion is in contact with the fitting structure, the first unit is non-electrically connected to the transmission base. In one embodiment, the matching structure is formed on an edge of the first wall portion.

In one embodiment of the present invention, an electronic apparatus includes a first unit and a transmission base. The first unit has a back side, a side portion and a first battery. A battery accommodating slot is formed on the back side. A fitting structure is formed on an end edge of the first battery. The first battery is accommodated in the battery accommodating slot. The transmission base includes a recessed portion, a first wall portion and a second wall portion opposite the first wall portion. The recessed portion is located between the first wall portion and the second wall portion. A matching structure is formed on an edge of the first wall portion. When the side portion of the first unit is placed in the recessed portion and the back side is adjacent to the first wall portion, the fitting structure and the matching structure are matched and assembled, and the first unit is electrically connected to the transmission base. When the side portion of the first unit is disposed in the recessed portion and the back side is adjacent to the second wall portion, the fitting structure is away from the matching structure, and the first unit is non-electrically connected to the transmission base.

In one embodiment, the electronic apparatus further includes a second unit, and the transmission base is pivotally provided at the second unit. Further, the fitting structure is a protrusion, the matching structure is an indentation, and the protrusion is matched and assembled in the indentation.

When the first unit is placed in the recessed portion and the back side is adjacent with the second wall portion, the fitting structure is overlappingly placed on the second wall portion. When the fitting structure is matched and assembled with the matching structure, the transmission base is capable of rotating relative to the first unit such that the second unit becomes adhered with the first unit. The first battery further includes a buffer member. When the matching structure is overlappingly placed on the second wall portion and the buffer member is in contact with the second unit, the transmission base and the first unit are tilted by an angle relative to the second unit.

When the first battery is accommodated in the battery accommodating slot, an end edge of the first battery extends out from the battery accommodating slot and is located on the back side. The first unit further includes a second battery. When the first battery is removed and the second battery is accommodated in the battery accommodating slot, a surface of the second battery and the back side jointly form a leveled plane.

DETAILED DESCRIPTION OF THE EMBODIMENTS

Figure 1:
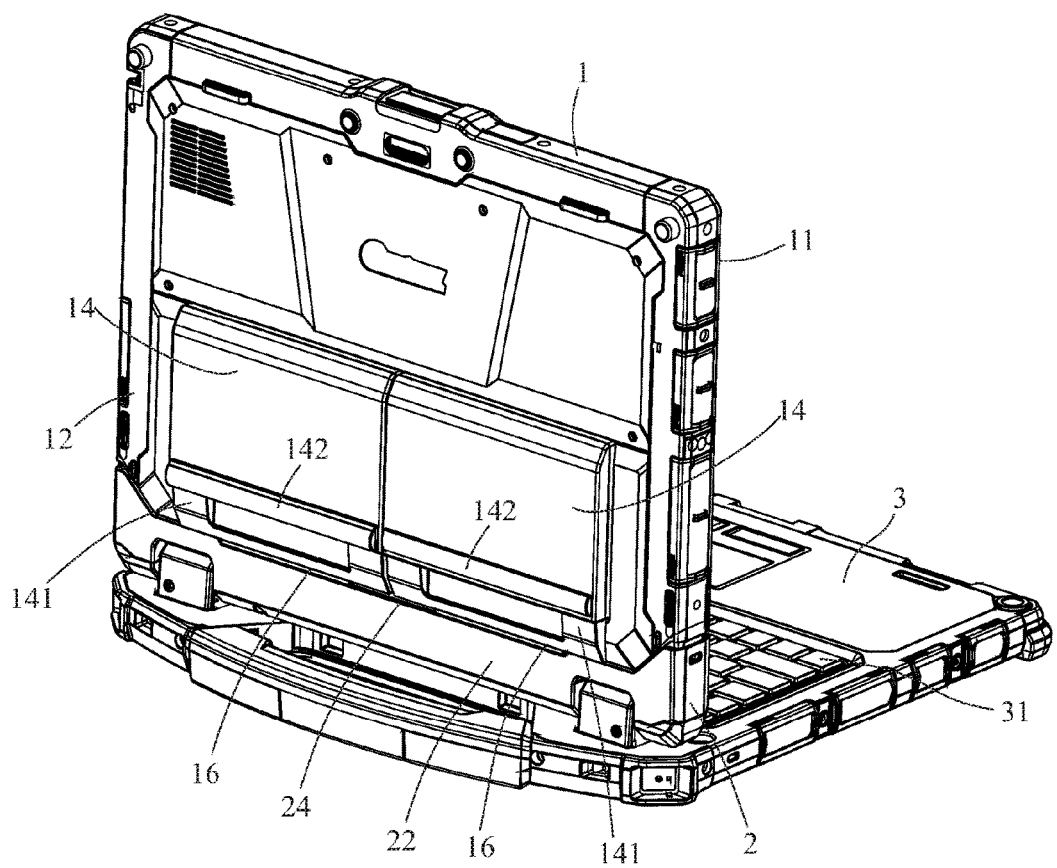
FIG. 1 is a perspective schematic diagram of an electronic apparatus of the present invention in a first state.
Figure 2:
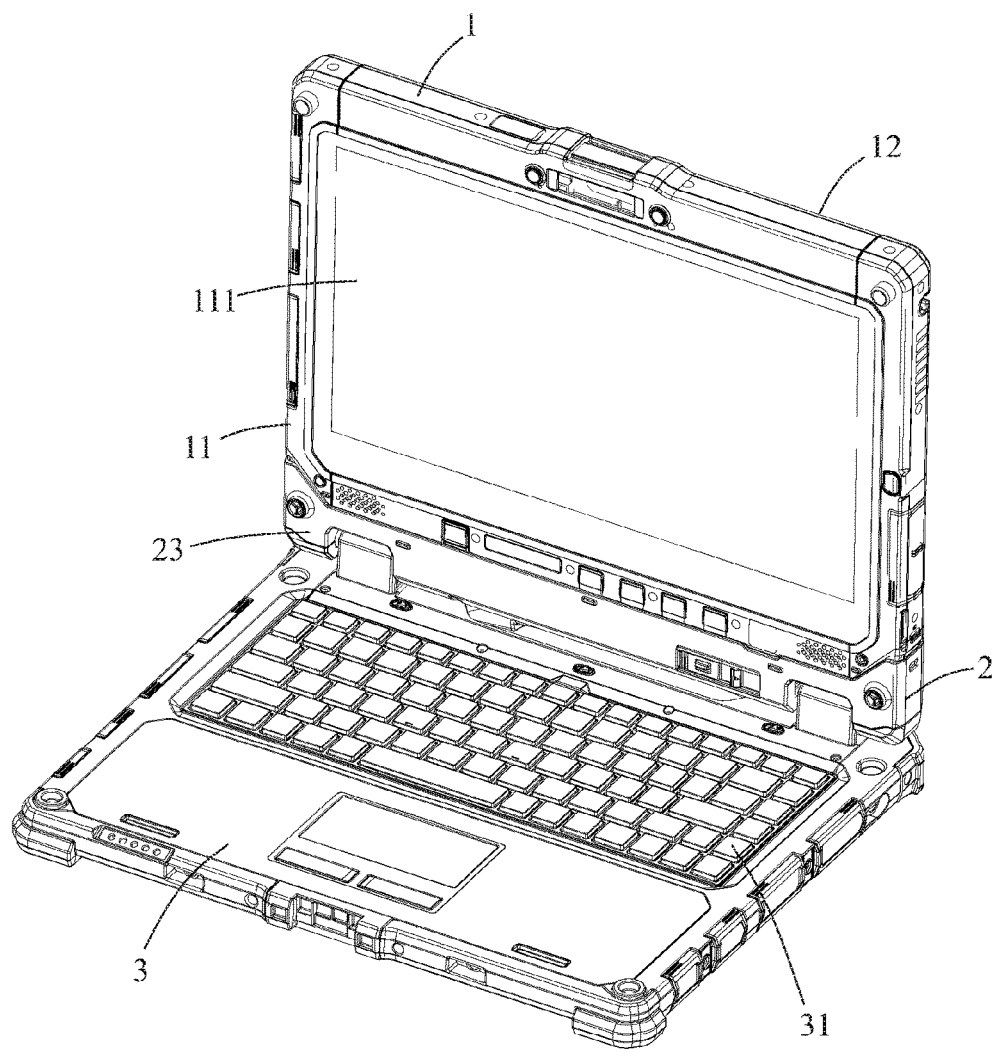
FIG. 2 is another perspective schematic diagram of an electronic apparatus of the present invention in the first state.

Referring to FIG. 1 and FIG. 2, an electronic apparatus 100 of the present invention includes a first unit 1, a transmission base 2 and a second unit 3. The transmission base 2 is connected between the first unit 1 and the second unit 3. Structure and combination details of the components are given below.

Figure 3:
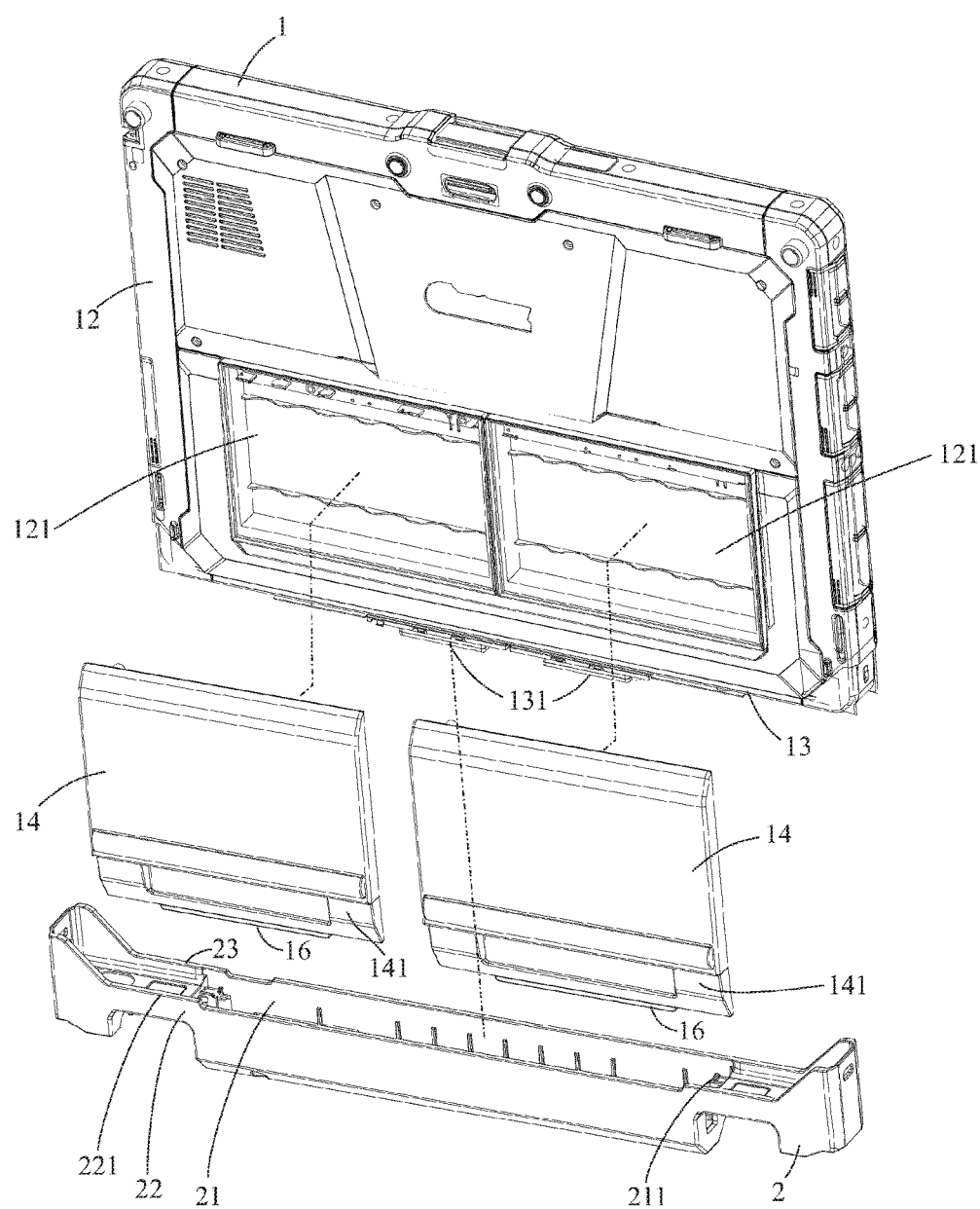
FIG. 3 is an exploded perspective schematic diagram of a transmission base and a first battery of the present invention.
Figure 5:
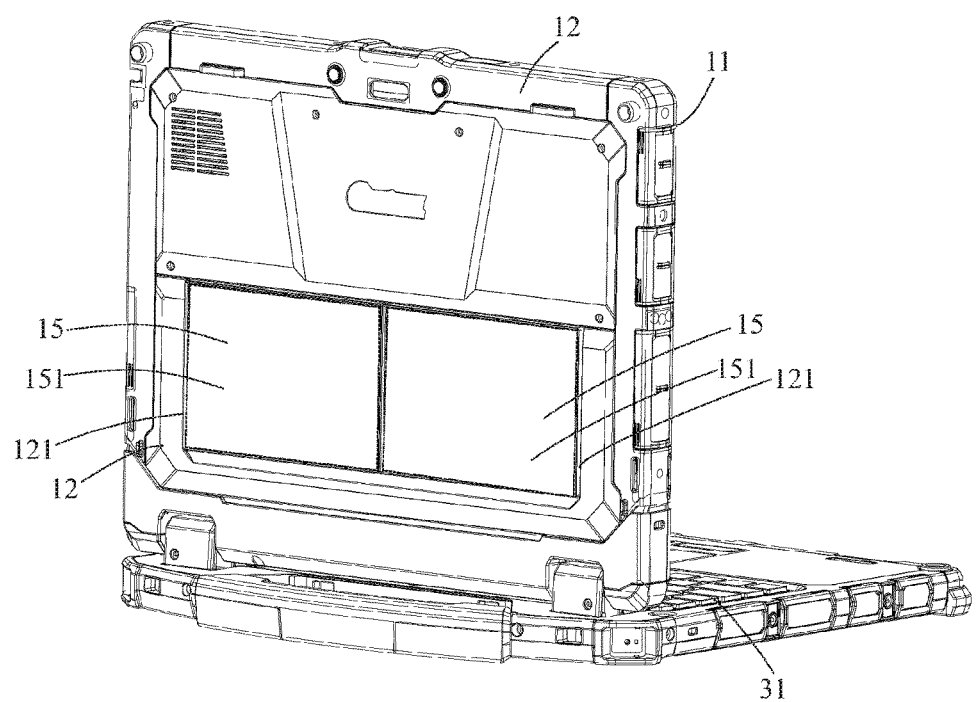
FIG. 5 is a perspective schematic diagram of an electronic apparatus of the present invention in a second state.

As shown in FIG. 2, FIG. 3 and FIG. 5, in this embodiment, the first unit 1 is a tablet computer, and includes a front side 11, a back side 12, a side portion 13, a plurality of first batteries 14 and a plurality of second batteries 15 (in this embodiment, the numbers of the first batteries 14 and the second batteries are two). The front side 11 is configured with a display portion 111, the side portion 13 is provided with a first electrical structure 131, and a battery accommodating slot 121 is formed at the back side 12. The battery accommodating slot 121 may be selectively configured with the plurality of first batteries 14 or the plurality of second batteries 15; that is, both of the first batteries 14 and the second batteries 15 can be detachably provided in the battery accommodating slot 121. In this embodiment, the first batteries 14 are large-capacity batteries, whereas the second batteries 15 are small-capacity batteries 15. Compared to the second batteries 15, the first batteries 14 are larger and thicker. Thus, when the first batteries 14 are accommodated in the battery accommodating slot 121, one end edge 141 of each first battery 14 extends out from the battery accommodating slot 121 and is located on the back side 12. Referring to FIG. 5, when the second batteries 15 are accommodated in the battery accommodating slot 121, a surface 151 of each second battery 15 and the back side 12 jointly form a leveled plane. Further, a fitting structure 16 is formed on the end edge 141 of each first battery 14. In this embodiment, the fitting structure 16 is a protrusion and extends out from the end edge 141.

The transmission base 2 includes a recessed portion 21, a first wall portion 22 and a second wall portion 23. The first wall portion 22 is opposite the second wall portion 23. The recessed portion 21 is located between the first wall portion 22 and the second wall portion 23, and a second electrical structure 211 is placed in the recessed portion 21. A matching structure 24 is formed on an edge 221 of the first wall portion 22. In this embodiment, the matching structure 24 is an indentation. One end of the transmission base 2 away from the recessed portion 21 is electrically pivotally connected to the second unit 3, and thus the transmission base 2 is allowed to rotate relative to the second unit 3. The second unit 3 is configured with an input portion 31, which is a keyboard in this embodiment.

The combination method of the first unit 1 and the transmission base 2 are described in detail below. The transmission base 2 is for bi-directionally receiving the side portion 13 of the first unit 1, and the first wall portion 22 and the second wall portion 23 are capable of bi-directionally supporting the side portion 13, i.e., the display portion 111 of the first unit 1 can be placed on the transmission base 2 in a manner of front-facing the input portion 31 of the second unit 3 or back-facing the input portion 31, thus achieving the effect of bi-directional receiving. Further, the first wall portion 22 and the second wall portion 23 are located on two sides of the side portion 13 of the first unit 1 to simultaneously support the side portion 13, hence achieving the effect of bi-direction support.

In continuation, as shown in FIG. 1 and FIG. 2, in a first state, the side portion 13 of the first unit 1 is placed in the recessed portion 21, and the fitting structure 16 is matched and assembled with the matching structure 24, that is, the fitting structure 16 is protrudingly and completely placed in the indentation (the matching structure 24), the back side 12 is adjacent to the first wall portion 22, and the front side 11 is adjacent to the second wall portion 23. At this point, the first electrical structure 131 can be completely connected to the second electrical structure 211, and the first unit 1 can be electrically connected to the second unit 3 through the transmission base 2. Hence, as shown in FIG. 2, a user can simultaneously view of the display portion 111 and the input portion 31, and can thus operate the display portion 111 of the first unit 1 through the input portion 31 of the second unit 3. After using, the first unit 1 and the transmission base 2 can be rotated by an angle relative to the second unit 3 until the display portion 111 is adhered on the input portion 31 so as to collapse and store (not shown) the electronic apparatus 100.

Figure 4:
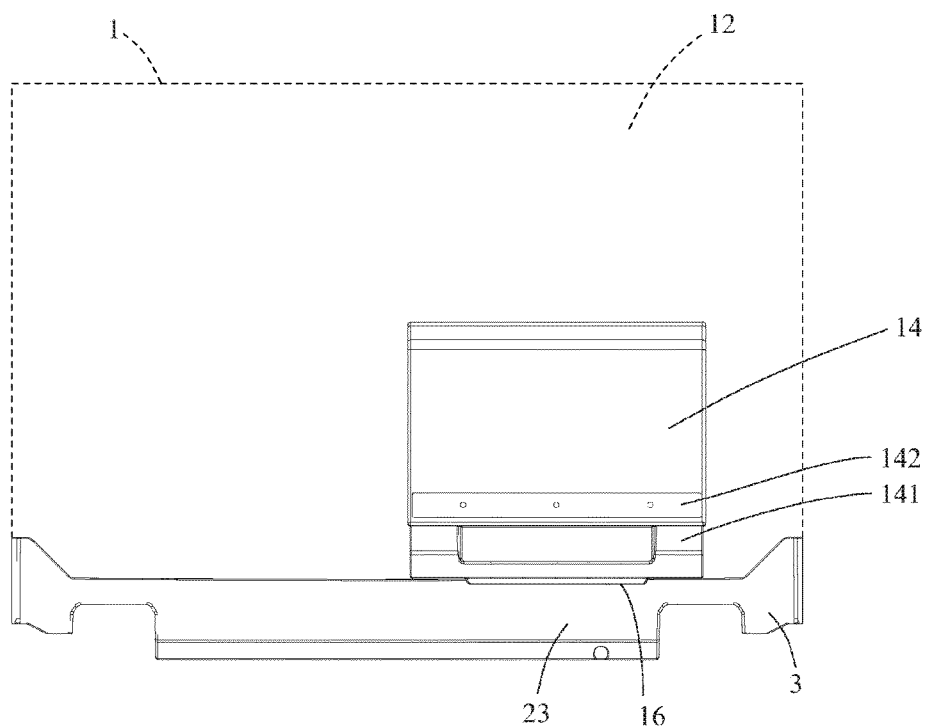
FIG. 4 is a schematic diagram of a first wall portion of a transmission base and a fitting structure of a first battery of the present invention.

FIG. 4 shows another combination state of the first unit 1 and the transmission base 2. Referring to FIG. 3, in a second state, although the side portion 13 of the first unit 1 is placed in the recessed portion 21, the fitting structure 16 is away from the matching structure 24, the back side 12 is adjacent to the second wall portion 23, the front side 11 is adjacent to the first wall portion 22, and the display portion 111 is back-facing the input portion 31. At this point, as shown in FIG. 4, the fitting structure 16 is overlappingly placed on the second wall portion 23 as it is a protrusion. Due to the mutual interference between the fitting structure 16 and the second wall portion 23, the first electrical structure 131 and the second electrical structure 211 are spaced by a distance. Thus, in the second state, the first unit 1 purely leans on the transmission base 2, which is equivalently non-electrically connected to the transmission base 2, such that the transmission base 2 and the second unit 3 are only applied to support and erect the first unit 1 on a desk, with the first unit 1 being incapable of electrically connecting to the transmission base 2 and the second unit 3. It should be noted that, in the second state, the electronic apparatus cannot be collapsed, thereby achieving a fool-proofing effect through the mutual interference between the second wall portion 23 and the fitting structure 16.

When an erroneous user operation turns the first unit 1, the first batteries 14 become close to the input portion 31. Because each first battery 14 is provided with the buffer member 142, the buffer member 142 is the first that comes into contact with the input portion 31 when the first unit 1 and the transmission base 2 are turned to as being tilted by an angle relative to the second unit 3, thus preventing the first batteries 14 from directly coming into contact with the input portion 31 and alleviating the downward pressing force.

In other embodiment of the present invention, the matching structure 24 may be formed at the second wall portion 23, and is formed in a dislocated manner relative to the fitting structure 16. Alternatively, the matching structure 24 of the second wall portion 23 may be a protrusion, so as to allow the fitting structure 16 to provide a greater degree of interference with the second wall portion 23.

Different from the first batteries 14, as shown in FIG. 5, due to the smaller volume and thickness of the second batteries 15, the surface 151 of each second battery 15 and the back side 12 jointly form a leveled plane when the second batteries 15 are accommodated in the battery accommodating slot 121. Thus, regardless of whether the display portion 111 is front-facing or back-facing the input portion 31, the first unit 1 can be adhered to the input portion 31 by the front side 11 or the back side 12, to further collapse and store the electronic apparatus 100. Further, the numbers of the first batteries 14 and the second batteries 15 are not herein limited. In other embodiments of the present invention, the numbers of the first batteries 14 and the second batteries 15 may be in singular or in plural.

In conclusion, in the transmission base and the electronic apparatus of the present invention, with the mutual interference between the fitting structure and the second wall portion of the transmission base, even in the presence of a large-capacity battery, a user can be reminded of avoiding directly contacting the first unit of the first battery with the input portion when the user collapses and stores the electronic apparatus, thereby protecting the integrity of the electronic apparatus.

While the invention has been described by way of example and in terms of the preferred embodiments to explain the technical features of the present invention, it is to be understood that the invention is not limited thereto. Any modifications and equivalent arrangements that can be made by a person skilled in the art are to be encompassed within the scope of the present invention, which should be accorded with the broadest interpretation of the appended claims.

What is claimed is:

1. A transmission base, operable to bi-directionally receive a first side portion of a first unit, the first unit being detachably configured with a first battery, the transmission base comprising:
   a first wall portion, comprising a matching structure, the matching structure for matching and assembling with a fitting structure of the first battery, when the first wall portion is in contact with the fitting structure, the matching structure matches and assembles with the fitting structure; and
   a second wall portion, opposite the first wall portion, the first wall portion and the second wall portion bi-directionally supporting the side portion, wherein the second wall portion having no matching structure, when the second wall portion is in contact with the fitting structure, the second wall portion interferes with the fitting structure;
   wherein, when the matching structure of the first wall portion is matched and assembled with the fitting structure, the first unit is electrically connected to the transmission base; when the second wall portion is in contact with the fitting structure, the first unit is non-electrically connected to the transmission base.

2. The transmission base according to claim 1, wherein the matching structure is formed on an edge of the first wall portion.

3. An electronic apparatus, comprising:
   a first unit, configured with a display portion, detachably configured with a first battery;
   a second unit, configured with an input portion; and
   a transmission base, pivotally connected to the second unit, bi-directionally receiving a side portion of the first unit, the transmission base comprising a first wall portion and a second wall portion that bi-directionally support the side portion, the first wall portion being opposite the second wall portion, the first wall portion provided with a matching structure, the matching structure matching with a fitting structure of the first battery, when the first wall portion is in contact with the fitting structure, the matching structure matches and assembles with the fitting structure, wherein the second wall portion having no matching structure, when the second wall portion is in contact with the fitting structure, the second wall portion interferes with the fitting structure;
   wherein, when the matching structure of the first wall portion is matched and assembled with the fitting structure, the first unit is electrically connected to the transmission base; when the second wall portion is in contact with the fitting structure, the first unit is non-electrically connected to the transmission base.

4. The electronic apparatus according to claim 3, wherein the matching structure is formed on an edge of the first wall portion.

5. An electronic apparatus, comprising:
   a first unit, comprising a back side, a side portion and a first battery, a battery accommodating slot formed on the back side, a fitting structure formed on an end edge of the first battery, the first battery accommodated in the battery accommodating slot; and
   a transmission base, comprising a recessed portion, a first wall portion and a second wall portion opposite the first wall portion, the recessed portion located between the first wall portion and the second wall portion, a matching structure formed on an edge of the first wall portion, wherein the second wall portion having no matching structure;
   wherein, when the side portion of the first unit is placed in the recessed portion and the back side is adjacent to the first wall portion and the first wall portion is in contact with the fitting structure, the fitting structure is matched and assembled with the matching structure and the first unit is electrically connected to the transmission base; when the side portion of the first unit is placed in the recessed portion and the back side is adjacent to the second wall portion and the second wall portion is in contact with the fitting structure, the second wall portion interferes with the fitting structure, and the first unit is non-electrically connected to the transmission base.

6. The electronic apparatus according to claim 5, wherein the fitting structure is a protrusion, the matching structure is an indentation, and the protrusion is matched and assembled in the indentation.

7. The electronic apparatus according to claim 5, wherein when the first unit is placed in the indentation and the back side is adjacent to the second wall portion, the fitting structure is overlappingly placed on the second wall portion.

8. The electronic apparatus according to claim 5, wherein when the first battery is accommodated in the battery accommodating slot, the end edge of the first battery extends out from the battery accommodating slot and is located on the back side; the first unit further comprises a second battery; when the first battery is removed and the second battery is accommodated in the battery accommodating slot, a surface of the second battery and the back side jointly form a leveled plane.

9. The electronic apparatus according to claim 5, further comprising a second unit, wherein the transmission base is pivotally provided at the second unit.

10. The electronic apparatus according to claim 9, wherein when the fitting structure is matched and assembled with the matching structure, the transmission base is capable of rotating relative to the first unit to cause the second unit to be adhered to the first unit; the first battery further comprises a buffer member; when the fitting structure is overlappingly placed on the second wall portion and the buffer member is in contact with the second unit, the transmission base and the first unit are tilted by an angle relative to the second unit.

* * * * *